United States Patent
Kats et al.

(10) Patent No.: US 11,128,473 B1
(45) Date of Patent: Sep. 21, 2021

(54) SYSTEMS AND METHODS FOR ASSURING AUTHENTICITY OF ELECTRONIC SENSOR DATA

(71) Applicant: Symantec Corporation, Mountain View, CA (US)

(72) Inventors: Daniel Kats, Culver City, CA (US); Christopher Gates, Culver City, CA (US); Acar Tamersoy, Culver City, CA (US); Daniel Marino, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 246 days.

(21) Appl. No.: 16/359,723

(22) Filed: Mar. 20, 2019

(51) Int. Cl.
*H04L 9/32* (2006.01)
*G06F 21/72* (2013.01)
*G06F 21/60* (2013.01)

(52) U.S. Cl.
CPC .......... *H04L 9/3247* (2013.01); *G06F 21/602* (2013.01); *G06F 21/72* (2013.01)

(58) Field of Classification Search
CPC ....... H04L 9/3247; G06F 21/72; G06F 21/602
See application file for complete search history.

(56) References Cited

U.S. PATENT DOCUMENTS

| | | | | |
|---|---|---|---|---|
| 7,120,252 B1 * | 10/2006 | Jones | ................... | H04N 7/1675 380/201 |
| 7,136,487 B1 * | 11/2006 | Schon | ................... | G06Q 50/16 380/229 |
| 9,832,023 B2 * | 11/2017 | Joyce, III | .............. | H04L 9/3231 |
| 10,588,175 B1 * | 3/2020 | Koeppel | ............... | H04L 9/3239 |
| 2006/0104474 A1 * | 5/2006 | Neogi | .................. | H04N 1/3217 382/100 |
| 2011/0320823 A1 * | 12/2011 | Saroiu | ................... | H04L 9/3218 713/189 |
| 2012/0324214 A1 * | 12/2012 | Asokan | ................. | H04L 9/3247 713/100 |
| 2017/0124356 A1 * | 5/2017 | Allyn | ........................ | H04L 9/30 |
| 2018/0316502 A1 * | 11/2018 | Nadeau | ................ | H04L 9/0637 |
| 2019/0007757 A1 * | 1/2019 | Reitsma | ................... | H04Q 9/00 |
| 2019/0068375 A1 * | 2/2019 | Mccord | ................ | H04L 9/0872 |
| 2019/0116044 A1 * | 4/2019 | Matsumoto | .......... | H04L 9/0897 |
| 2019/0261063 A1 * | 8/2019 | Woodman | ........ | H04N 21/44008 |
| 2019/0302766 A1 * | 10/2019 | Mondello | ................ | G06N 3/02 |

OTHER PUBLICATIONS

Kuntze et al.; "Secure Digital Chains of Evidence", 2011, IEEE, pp. 1-8. (Year: 2011).*

(Continued)

*Primary Examiner* — Matthew Smithers
(74) *Attorney, Agent, or Firm* — FisherBroyles, LLP

(57) ABSTRACT

The disclosed method for assuring authenticity of electronic sensor data may include (i) capturing, using a sensor within a device, electronic sensor data, and (ii) digitally signing, using a cryptoprocessor embedded within the device, the electronic sensor data to create a digital signature that verifies that the signed electronic sensor data has not been modified since the electronic sensor data was captured by the sensor. Various other methods, systems, and computer-readable media are also disclosed.

20 Claims, 4 Drawing Sheets

(56) References Cited

OTHER PUBLICATIONS

Wikipedia, "Trusted Platform Module", URL : https://en.wikipedia.org/wiki/Trusted_Plafform_Module, retrieved on Jun. 27, 2019, pp. 1-10.
Kaplan et al., "AMD Memory Encryption", URL: http://amd-dev.wpengine.netdna-cdn.com/wordpress/media/2013/12/AMD_Memory_Encryption_Whitepaper v7-Public_pdf, White Paper, Apr. 21, 2016, 12 pages.
"Intel® Software Guard Extensions", URL: https://software.intel.com/en-us/sgx, Intel® Software, Developer Zone, retrieved on Jun. 27, 2019, pp. 1-5.
ARM, "Products Security", URL: https://www.arm.com/products/silicon-ip-security, retrieved on Jun. 27, 2019, pp. 1-11.
Colp et al., "Protecting Data on Smartphones and Tablets from Memory Attacks", URL: http://dx.doi.org/10.1145/2694344/2694380, ASPLOS '15, Mar. 14-18, 2015, pp. 177-189.
Wikipedia, "Trusted timestamping", URL: https://en.wikipedia.org/wiki/Trusted_timestamping, retrieved on Jun. 27, 2019, pp. 1-4.
Swanson et al., "Multimedia Data-Embedding and Watermarking Technologies", Proceedings of the IEEE, vol. 86, No. 6, Jun. 1998, pp. 1064-1087.
Langelaar et al., "Watermarking Digital Image and Video Data—A State-of-the-Art Overview", IEEE Signal processing magazine, vol. 17, No. 5, Sep. 2000, pp. 20-46.
Bhowmik et al., "The Multimedia Blockchain: A Distributed and Tamper-Proof Media Transaction Framework", Digital Signal Processing (DSP), 22nd International Conference, IEEE, Nov. 2017, 5 pages.
"UPROOV", URL: http://uproov.com/guides/Uproov%20Mobile%20Verification%20Technology%20Guide%20-%20Consumer.pdf, Ledger Assets, 2015, 11 pages.
Bosch, "Bosch Security Systems—Video Systems", Aug. 2016, pp. 1-9.

\* cited by examiner

SYSTEMS AND METHODS FOR ASSURING AUTHENTICITY OF ELECTRONIC SENSOR DATA

BACKGROUND

In the modern media age the problems of "fake news" and media hoax stories are on the rise. Photos and videos are often doctored to suit a deceptive agenda. On the other hand, legitimate photos and videos are often claimed to be doctored, when the truth instead is that these photos and videos show authentic and non-doctored content that is just inconvenient or embarrassing. Conventional techniques for addressing and resolving these disputes may be limited to establishing some degree of trust in the organizations publicizing this media and/or through rigorous vetting processes. The present disclosure, therefore, identifies and addresses a need for improved systems and methods for assuring authenticity of electronic sensor data.

SUMMARY

As will be described in greater detail below, the present disclosure describes various systems and methods for assuring authenticity of electronic sensor data. In one example, a method for assuring authenticity of electronic sensor data may include (i) capturing, using a sensor within a device, electronic sensor data and (ii) digitally signing, using a cryptoprocessor embedded within the device, the electronic sensor data to create a digital signature that verifies that the signed electronic sensor data has not been modified since the electronic sensor data was captured by the sensor.

In one example, the digital signature verifies that the signed electronic sensor data has not been deceptively modified since the electronic sensor data was captured by the sensor. In further examples, the cryptoprocessor is positioned adjacent the sensor and the cryptoprocessor digitally signs the electronic sensor data from the sensor prior to the electronic sensor data being exposed to a component of the device that is capable of modifying the electronic sensor data.

In one example, the digital signature verifies that a component of the device has not modified the electronic sensor data since the electronic sensor data was captured by the sensor. In further examples, the digital signature verifies that a user of the device has not used the device to modify the signed electronic sensor data since the electronic sensor data was captured by the sensor.

In one example, the device includes an enclave embedded adjacent to the sensor. In further examples, a trusted channel connects the enclave to the cryptoprocessor.

In one example, a data pipeline of the device ensures that the digital signature is created subsequent to the sensor capturing the electronic sensor data and prior to modification of the electronic sensor data. In further examples, the digital signature further includes a digital signature of metadata describing the electronic sensor data. Additionally, in some examples, the digital signature verifies that the signed electronic sensor data has not been modified since the electronic sensor data was captured by the sensor as distinct from verifying that the signed electronic sensor data has not been modified since the electronic sensor data was extracted from the device.

In one embodiment, a system for implementing the above-described method may include a capturing module, stored in memory, that captures, using a sensor within a device, electronic sensor data and a signature module, stored in memory that digitally signs, using a cryptoprocessor embedded within the device, the electronic sensor data to create a digital signature that verifies that the signed electronic sensor data has not been modified since the electronic sensor data was captured by the sensor. The system may also include at least one physical processor that is configured to execute the capturing module and the signature module.

In some examples, a corresponding device may be configured to (i) capture, using a sensor within the device, electronic sensor data and (ii) digitally sign, using a cryptoprocessor embedded within the device, the electronic sensor data to create a digital signature that verifies that the signed electronic sensor data has not been modified since the electronic sensor data was captured by the sensor.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
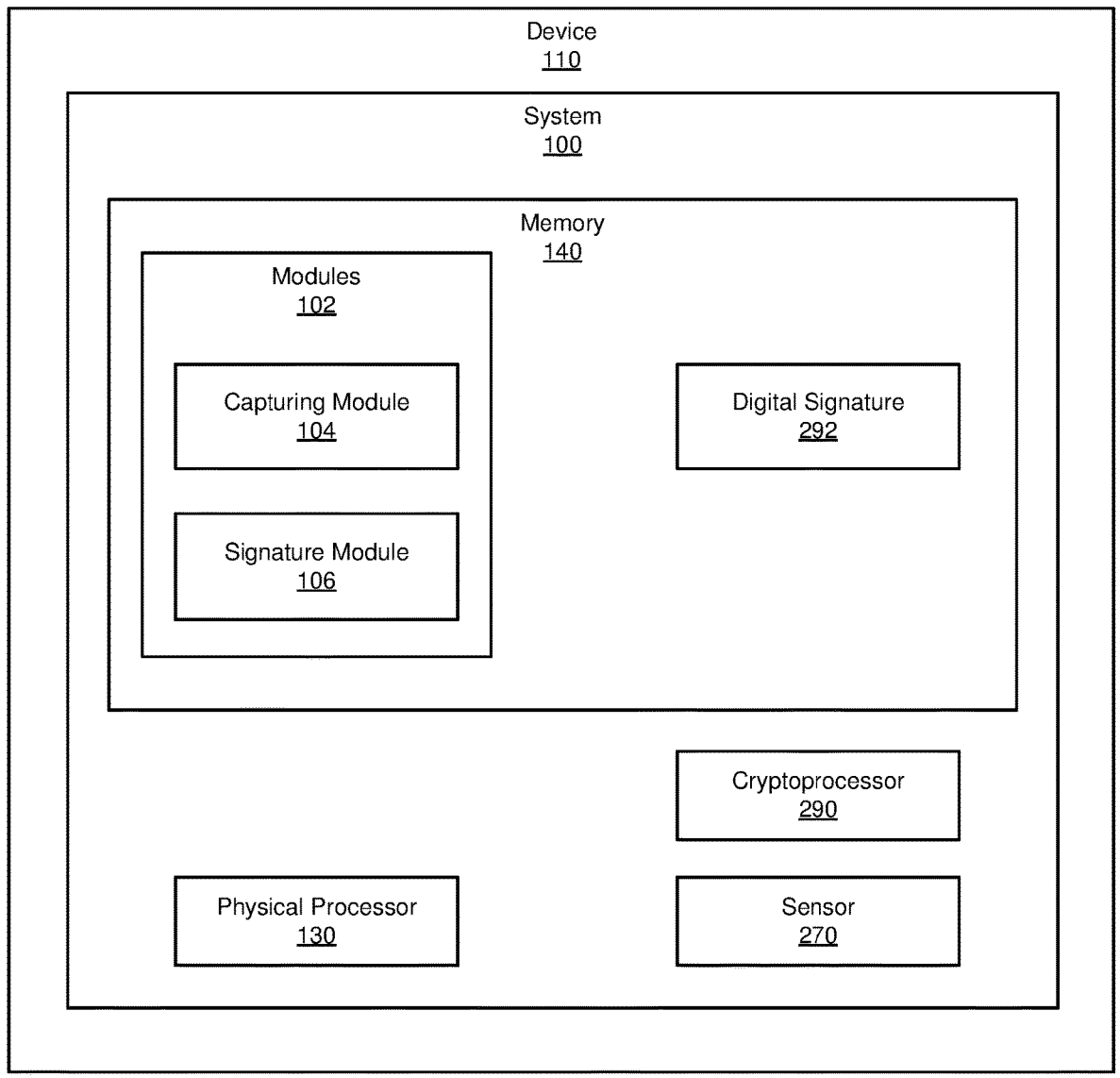
FIG. 1 is a block diagram of an example system for assuring authenticity of electronic sensor data.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for assuring authenticity of electronic sensor data. The disclosed subject matter may improve upon related systems by improving the ability of individuals and organizations, such as news organizations and law enforcement organizations, to provide assurances to others of integrity and authenticity of one or more items of multimedia content. The disclosed subject matter may leverage cryptoprocessors embedded within capture devices such as microphones and cameras in a novel and inventive manner to thereby achieve these improvements in the ability to provide assurances of integrity and authenticity.

The following will provide, with reference to FIG. 1, detailed descriptions of example systems for assuring authenticity of electronic sensor data. Detailed descriptions of corresponding methods will also be provided in connection with FIGS. 2-4.

FIG. 1 is a block diagram of an example system 100 for digitally signing data, which may be embedded within a device 110, such as a microphone, camera, and/or video camera. As illustrated in this figure, example system 100 may include one or more modules 102 for performing one or more tasks. For example, and as will be explained in greater detail below, example system 100 may include a capturing module 104, stored in memory, that captures, using a sensor 270 within device 110, electronic sensor data. Moreover, system 100 may also include a signature module 106, stored in memory, that digitally signs, using a cryptoprocessor 290 (e.g., such as a TRUSTED PLATFORM MODULE cryptoprocessor) embedded within device 110, the electronic sensor data to create a digital signature 292 that verifies that the signed electronic sensor data has not been modified since the electronic sensor data was captured by sensor 270. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate assuring authenticity of electronic sensor data. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
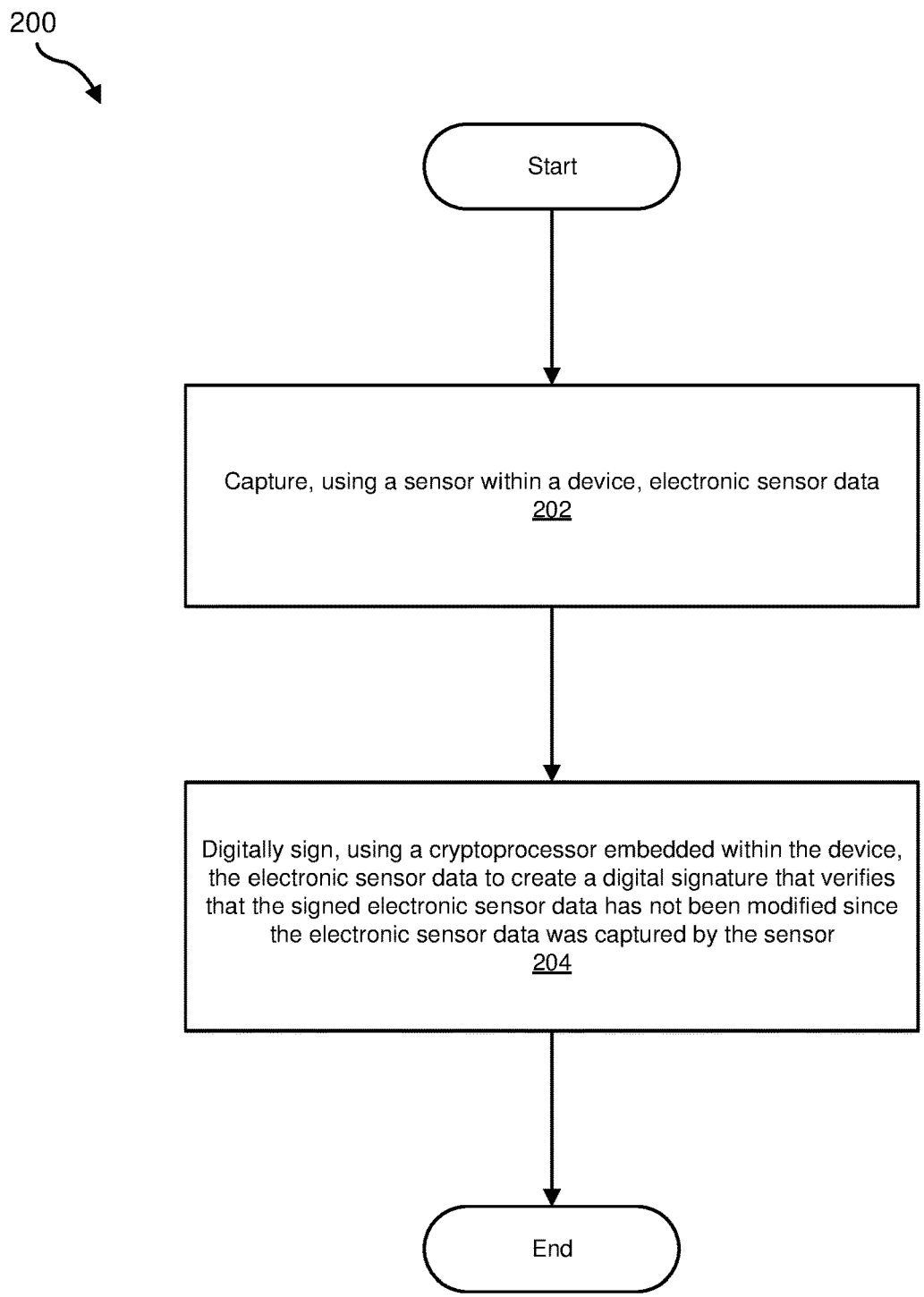
FIG. 2 is a flow diagram of an example method for assuring authenticity of electronic sensor data.

FIG. 2 is a flow diagram of an example method 200 for assuring authenticity of electronic sensor data. In one example, each of the steps shown in FIG. 2 may represent an algorithm whose structure includes and/or is represented by multiple sub-steps, examples of which will be provided in greater detail below.

As illustrated in FIG. 2, at step 202, one or more of the systems described herein may capture, using a sensor within a device, electronic sensor data. For example, capturing module 104 may capture, using sensor 270 within device 110, electronic sensor data.

Capturing module 104 may perform step 202 in a variety of ways. Illustrative examples of corresponding capture devices may include microphones, cameras, and video cameras. Each one of these illustrative examples of capture devices may include a corresponding sensor that captures electronic sensor data, such as audio data, visual data, and/or audiovisual data, etc. Additionally, or alternatively, in other examples the capture device may capture electronic sensor data corresponding to any other suitable content detectable through one or more of the five human senses. For example, other illustrative examples of the electronic sensor data may include haptic interface content and/or virtual reality content.

Returning to FIG. 2, at step 204, one or more of the systems described herein may digitally sign, using a cryptoprocessor embedded within the device, the electronic sensor data to create a digital signature that verifies that the signed electronic sensor data has not been modified since the electronic sensor data was captured by the sensor. For example, at step 204, signature module 106 may digitally sign, using cryptoprocessor 290 embedded within device 110, the electronic sensor data to create digital signature 292 that verifies that the signed electronic sensor data has not been modified since the electronic sensor data was captured by sensor 270. As used herein, the phrase "verifies that the signed electronic sensor data has not been modified since the electronic sensor data was captured by the sensor" generally refers to the cryptoprocessor applying the digital signature process at such an early stage after capturing the electronic sensor data that the electronic sensor data has not already been modified and, moreover, that this feature of assuring the lack of modification results from the design specifications for the capture device, whereby the design ensures that the digital signature process is applied at this specifically early stage.

Signature module 106 may perform step 204 in a variety of ways. In general, step 204 may leverage the inventive insight that, even if the cryptoprocessor is disposed within a capture device, such as a microphone or camera, the cryptoprocessor may only be assigned to the capture device as a whole, rather than being assigned specifically to the sensor that originally captures raw electronic sensor data. Moreover, many different types of capture devices today include many complex editing, management, revision, and/or modification features. Accordingly, capture devices that only associate the cryptoprocessor with the capture device as a whole thereby suffer from a vulnerability whereby the cryptoprocessor might digitally sign media content after one or more components of the capture device has already modified the original raw and unmodified data from the sensor.

As outlined above, in some scenarios the cryptoprocessor might only digitally sign a photograph, for example, after the user who was manually operating a digital camera has already modified the original raw and unmodified data from the sensor in a variety of different ways. Moreover, some of these different modifications may be potentially deceptive. For example, depending on the sophistication and complexity of the capture device, the user might deceptively modify a picture to make a person in the picture to appear to be more overweight than the person actually is, or more slender than the person actually is. After making a deceptive modification like this, the user may extract the photograph from the camera, and the cryptoprocessor may digitally sign the modified photograph to thereby provide an assurance that the photograph originated from the camera having that specific cryptoprocessor.

Even in the scenario outlined above, the digital signature from the cryptoprocessor has not prevented the user from deceptively modifying the original raw and unmodified data from the sensor. It would be desirable, therefore, to provide digital signatures that assure users that electronic sensor data has not been modified, as distinct from simply assuring users that data has emerged, modified or unmodified, from one or more microphones or cameras, etc.

In view of the above, in some scenarios the digital signature may assure that the signed electronic sensor data has not been deceptively modified after leaving the sensor. For example, the capture device may contain one or more buttons, features, and/or options for deceptively modifying capture electronic sensor data. In one more specific example, a capture device may enable the user to remove an excerpt from a conversation captured by a microphone sensor, and then stitch the remaining portions together, deceptively creating the illusion that the removed portion was never actually captured by the microphone sensor.

Accordingly, a manufacturer may configure such a microphone, or other suitable capture device, such that the process of the cryptoprocessor digitally signing the conversation occurs immediately, or almost immediately, after the conversation was captured as raw and unmodified data from the microphone sensor, and before the corresponding data is exposed to any component that would enable the user to remove the portion, as discussed above. In some examples, signature module 106 may further utilize a cryptographic communication subsystem, enclave, and/or trusted channel to prevent any data from being exposed to components that have the capability to manipulate or modify the electronic sensor data, at least until the digital signature process has been applied in accordance with step 204.

Consistent with the inventive insight that is discussed at length above, in another example, the cryptoprocessor may be disposed adjacent the sensor such that the cryptoprocessor digitally signs electronic sensor data from the sensor prior to the electronic sensor data being exposed to a component of the capture device that is capable of modifying the electronic sensor data. In even further examples, the capture device may be configured such that the digital signature assures that a component (e.g., any component) of the capture device has not modified the signed electronic sensor data after leaving the sensor. In even more specific examples, the digital signature may assure that a user of the capture device has not used the capture device to modify the signed electronic sensor data after leaving the sensor, as further discussed above. Moreover, of course, the capture device may also digitally sign any instance of metadata that describes the underlying electronic sensor data and/or the process of capturing the electronic sensor data (e.g., and this metadata may optionally be embedded as a watermark within an audio/visual recording, for example, prior to the digital signature process).

Figure 3:
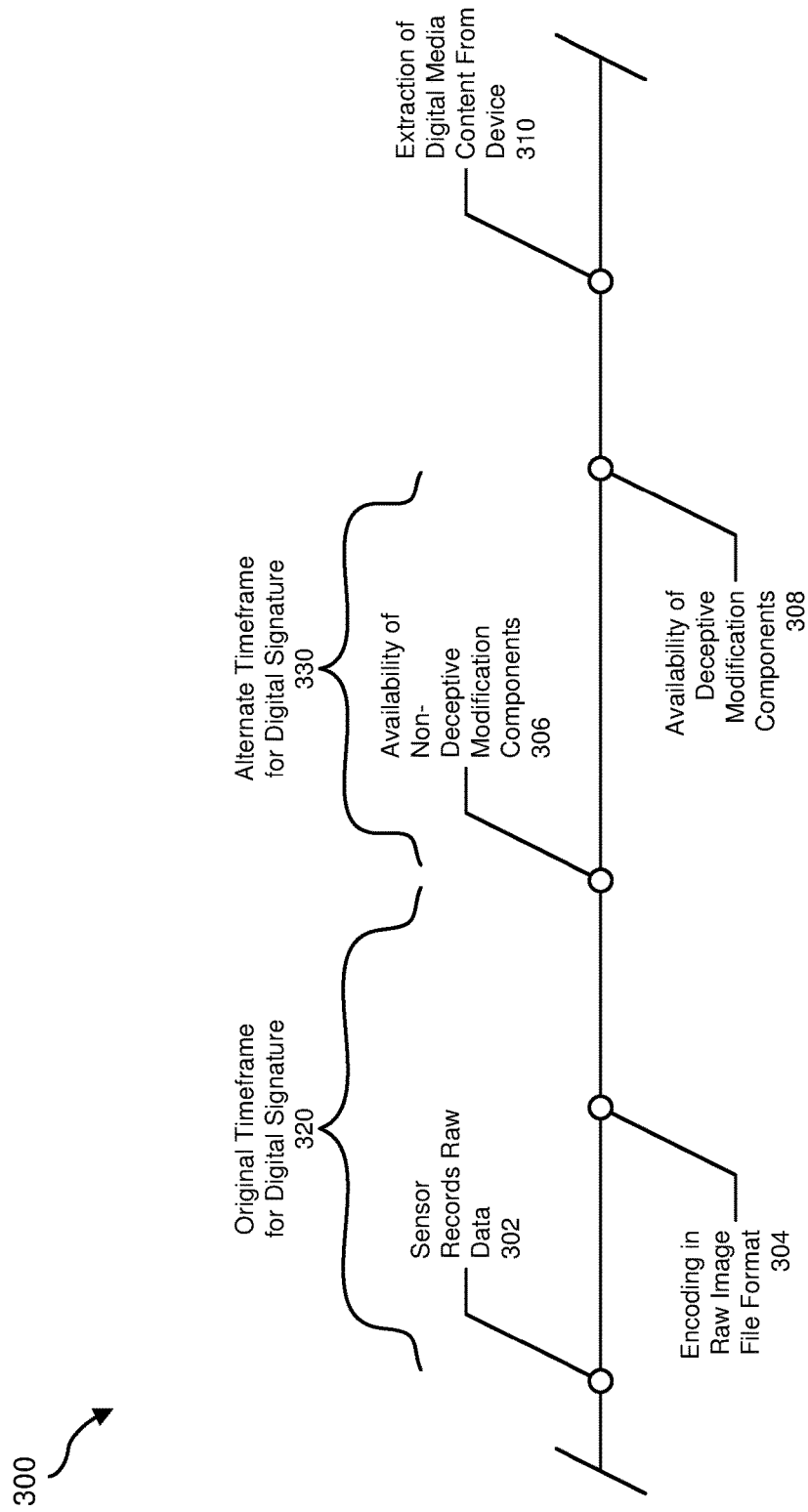
FIG. 3 is a block diagram of an example timing diagram relating to the example method for assuring authenticity of electronic sensor data.

In additional examples, a data pipeline of the capture device ensures that the digital signature is created subsequent to the sensor capturing the electronic sensor data and prior to modification of the electronic sensor data. To help illustrate this concept, FIG. 3 shows a timing diagram 300 corresponding to a data pipeline within a device such as device 110. As further shown in this figure, timing diagram 300 may include a series of several points in time, from left to right, in chronological order, helping to illustrate how data is processed within the capture device.

Timing diagram 300 may begin with a point in time 302, where the sensor of the capture device originally captures raw and unmodified electronic sensor data. From point in time 302, timing diagram 300 may proceed to point in time 304, where the raw and unmodified electronic sensor data may be encoded within one or more raw image file formats. A non-exhaustive illustrative list of such raw image file formats may include: DCR, K25, KDC (Kodak), CRW CR2 CR3 (Canon), ERF (Epson), MEF (Mamiya), MOS (Leaf), NEF (Nikon), ORF (Olympus), PEF (Pentax), RW2 (Panasonic) and ARW, SRF, SR2 (Sony). Furthermore, from point in time 304, timing diagram 300 may proceed to point in time 306, at which point one or more components for non-deceptively editing or modifying the electronic sensor data may become available or may gain access to the underlying electronic sensor data captured by the sensor.

As further shown in FIG. 3, in one optional embodiment, the step of digitally signing the underlying electronic sensor data may be performed at any point across an original timeframe for digital signature 320. Original timeframe for digital signature 320 may span from point in time 302 to point in time 306. In other words, original timeframe for digital signature 320 corresponds to any time between capturing the underlying electronic sensor data by the sensor and the timing of making any modification components available, or otherwise giving one or more of these components access to the electronic sensor data. By preventing any modification-capable component from having access to the electronic sensor data prior to this electronic sensor data being signed through the cryptoprocessor of the capture device, signature module 106 may thereby help to provide a security feature whereby the digital signature assures one or more users that the corresponding digitally signed content is the same as the raw and unmodified content originally captured by the sensor.

The digital signature may provide the assurance of step 204 because the digital signature may correspond to a public-private key pair assigned (through the cryptoprocessor) to the specific make, model, and/or brand of capture device (e.g., through use of a certificate authority publishing or certifying this information, or otherwise through the use of a public-key infrastructure). Accordingly, the digital signature may thereby enable any one or more users who verify such a digital signature to further verify that the capture device used to capture this content has the design corresponding to step 204 (i.e., a design that ensures that electronic sensor data is digitally signed as soon as it is captured and prior to any potential modification). In other words, a user or observer who obtains a digitally signed photograph (or other media content) from a capture device in accordance with step 204 will be able to verify that the photograph originated from a device having a design providing the assurance of data integrity and authenticity, straight off of the sensor, as further discussed above.

Nevertheless, FIG. 3 also further illustrates how, in some alternative embodiments, the focus of system 100 may be on preventing deceptive modification of electronic sensor data, rather than simply preventing any modification of electronic sensor data. Some relatively minor and basic media modification operations may enable a user to enhance, or otherwise modify, an instance of electronic sensor data, without necessarily doing so in a significantly deceptive way. Simple and basic operations like modifying the color balance, modifying the contrast, modifying the effective focal length, modifying the brightness, etc., may enable the user to still modify a photograph, without necessarily doing so in a significantly deceptive way. Parallel observations apply to other capture devices, such as microphones.

In some of the scenarios outlined above, it may nevertheless be helpful to enable the user to perform one or more simple and basic, non-deceptive modification operations prior to the digital signature process. Accordingly, FIG. 3 further illustrates an alternative timeframe for digital signature 330, during which the digital signature process through the cryptoprocessor may still be performed (e.g., in addition to, or as an alternative to, original timeframe for digital signature 320). Alternate timeframe for digital signature 330 spans from point in time 306, as discussed above, to a point in time 308, at which point more deceptive electronic sensor data modification components may become available to the user, or otherwise obtain access to the electronic sensor data originally captured by the sensor at point in time 302. During alternate timeframe for digital signature 330, the digital signature process may nevertheless still be performed without necessarily compromising an assurance that the resulting electronic sensor data has not been modified in a significantly deceptive way. Lastly, FIG. 3 also illustrates how, according to timing diagram 300, at a point in time 310, the user may optionally extract the electronic sensor data from device 110, thereby concluding timing diagram 300.

Figure 4:
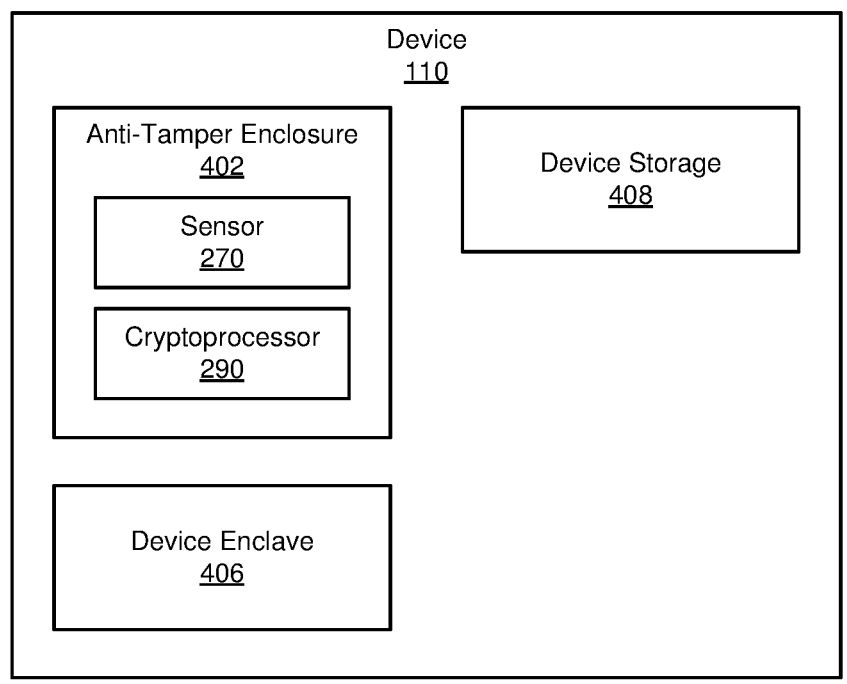
FIG. 4 is an expanded block diagram of an example device for digitally signing data.

Additionally, FIG. 4 shows an expanded block diagram of an example of device 110. As further shown in this figure, device 110 may include an anti-tamper enclosure 402. The anti-tamper nature of anti-tamper enclosure 402 may help to preserve the integrity of electronic sensor data captured by the sensor, as indicated by the digital signature. In other words, anti-tamper enclosure 402 may help to prevent one or more potentially malicious users from tampering with this enclosure to deceptively modify one or more instances of electronic sensor data. Additionally, FIG. 4 also further illustrates how anti-tamper enclosure 402 may further include both sensor 270 and cryptoprocessor 290, as further discussed above. Accordingly, the disposition of both sensor 270 and cryptoprocessor 290 within anti-tamper enclosure 402 may help to ensure that instances of electronic sensor data recorded by sensor 270 and digitally signed by cryptoprocessor 290 maintain a level of integrity and authenticity, without being tampered with, or otherwise modified or manipulated.

Moreover, FIG. 4 also further illustrates how the capture device may further include both a device enclave 406 and a device storage 408. Furthermore, FIG. 4 also outlines how both device enclave 406 and device storage 408 are optionally disposed in a location that is independent and separated from anti-tamper enclosure 402, as further discussed above. Accordingly, the digital signature process by cryptoprocessor 290 may be effectively protected from any disturbance or modification that would otherwise be available through device enclave 406 and/or device storage 408. Additionally, FIG. 4 also further illustrates how cryptoprocessor 290 may optionally digitally sign one or more instances of electronic sensor data recorded by sensor 270 within anti-tamper enclosure 402 prior to any instance of electronic sensor data being recorded within device storage 408.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method for assuring authenticity of electronic sensor data, at least a portion of the method being performed by a computing device comprising at least one processor, the method comprising:
   capturing, using a sensor within a device, electronic sensor data; and
   digitally signing, using a cryptoprocessor embedded within the device, the electronic sensor data to create a digital signature that verifies that the signed electronic sensor data has not been deceptively modified since the electronic sensor data was captured by the sensor;
   wherein:
   the computing device prevents deceptive modification of the electronic sensor data rather than simply preventing any modification of the electronic sensor data;
   the computing device permits a substantially non-deceptive media modification operation that enhances the electronic sensor data in a non-deceptive manner prior to the digitally signing; and
   a timeframe for performing the digitally signing within a data pipeline spans from a point in time when a component for performing the substantially non-deceptive media modification operation becomes available until a point in time when a component for performing a deceptive media modification operation becomes available.

2. The method of claim 1, wherein the cryptoprocessor comprises a Trusted Platform Module.

3. The method of claim 1, wherein:
   the cryptoprocessor is positioned adjacent the sensor; and
   the cryptoprocessor digitally signs the electronic sensor data from the sensor prior to the electronic sensor data being exposed to the component of the device that is capable of deceptively modifying the electronic sensor data.

4. The method of claim 1, wherein the digital signature verifies that a component of the device has not deceptively modified the electronic sensor data since the electronic sensor data was captured by the sensor.

5. The method of claim 4, wherein the digital signature verifies that a user of the device has not used the device to deceptively modify the signed electronic sensor data since the electronic sensor data was captured by the sensor.

6. The method of claim 1, wherein the device includes an enclave embedded adjacent to the sensor.

7. The method of claim 6, wherein a trusted channel connects the enclave to the cryptoprocessor.

8. The method of claim 1, wherein the data pipeline of the device ensures that the digital signature is created subsequent to the sensor capturing the electronic sensor data and prior to deceptive modification of the electronic sensor data.

9. The method of claim 1, wherein the digital signature further includes a digital signature of metadata describing the electronic sensor data.

10. The method of claim 1, wherein the digital signature verifies that the signed electronic sensor data has not been deceptively modified since the electronic sensor data was captured by the sensor as distinct from verifying that the signed electronic sensor data has not been deceptively modified since the electronic sensor data was extracted from the device.

11. A system for assuring authenticity of electronic sensor data, the system comprising:
 a capturing module, stored in memory, that captures, using a sensor within a device, electronic sensor data;
 a signature module, stored in memory, that digitally signs, using a cryptoprocessor embedded within the device, the electronic sensor data to create a digital signature that verifies that the signed electronic sensor data has not been deceptively modified since the electronic sensor data was captured by the sensor; and
 at least one physical processor configured to execute the capturing module and the signature module;
 wherein:
 the system prevents deceptive modification of the electronic sensor data rather than simply preventing any modification of the electronic sensor data;
 the system permits a substantially non-deceptive media modification operation that enhances the electronic sensor data in a non-deceptive manner prior to the digitally signing; and
 a timeframe for performing the digitally signing within a data pipeline spans from a point in time when a component for performing the substantially non-deceptive media modification operation becomes available until a point in time when a component for performing a deceptive media modification operation becomes available.

12. The system of claim 11, wherein the digital signature verifies that the signed electronic sensor data has not been deceptively modified since the electronic sensor data was captured by the sensor.

13. The system of claim 11, wherein:
 the cryptoprocessor is positioned adjacent the sensor; and
 the cryptoprocessor digitally signs the electronic sensor data from the sensor prior to the electronic sensor data being exposed to a component of the device that is capable of deceptively modifying the electronic sensor data.

14. The system of claim 11, wherein the digital signature verifies that a component of the device has not deceptively modified the electronic sensor data since the electronic sensor data was captured by the sensor.

15. The system of claim 14, wherein the digital signature verifies that a user of the device has not used the device to deceptively modify the signed electronic sensor data since the electronic sensor data was captured by the sensor.

16. The system of claim 11, wherein the device includes an enclave embedded adjacent to the sensor.

17. The system of claim 16, wherein a trusted channel connects the enclave to the cryptoprocessor.

18. The system of claim 11, wherein the data pipeline of the device ensures that the digital signature is created subsequent to the sensor capturing the electronic sensor data and prior to deceptive modification of the electronic sensor data.

19. The system of claim 11, wherein the digital signature further includes a digital signature of metadata describing the electronic sensor data.

20. A device that is configured to:
 capture, using a sensor within the device, electronic sensor data; and
 digitally sign, using a cryptoprocessor embedded within the device, the electronic sensor data to create a digital signature that verifies that the signed electronic sensor data has not been deceptively modified since the electronic sensor data was captured by the sensor;
 wherein:
 the device prevents deceptive modification of the electronic sensor data rather than simply preventing any modification of the electronic sensor data;
 the device permits a substantially non-deceptive media modification operation that enhances the electronic sensor data in a non-deceptive manner prior to the digitally signing; and
 a timeframe for performing the digitally signing within a data pipeline spans from a point in time when a component for performing the substantially non-deceptive media modification operation becomes available until a point in time when a component for performing a deceptive media modification operation becomes available.

* * * * *